US012695136B2

(12) United States Patent (10) Patent No.: US 12,695,136 B2
Ju et al. (45) Date of Patent: Jul. 28, 2026

(54) BATTERY MODULE HAVING COOLING STRUCTURE USING INSULATION COOLANT, AND BATTERY PACK AND VEHICLE WHICH INCLUDE SAME

(71) Applicants: LG Energy Solution, Ltd., Seoul (KR); Renault S.A.S, Boulogne-Billancourt (FR)

(72) Inventors: Eun-Ah Ju, Daejeon (KR); Hyeon-Ki Yun, Daejeon (KR); Guenter Tannenberger, Pobenhausen (DE); Jan Janke, Brackenheim (DE); Uwe Harasztosi, Neckarsulm (DE)

(73) Assignees: LG Energy Solution, Ltd., Seoul (KR); Renault S.A.S, Boulogne-Billancourt (FR)

( * ) Notice: Subject to any disclaimer, the term of this patent is extended or adjusted under 35 U.S.C. 154(b) by 713 days.

(21) Appl. No.: 18/021,101

(22) PCT Filed: Aug. 4, 2021

(86) PCT No.: PCT/KR2021/010297
§ 371 (c)(1),
(2) Date: Feb. 13, 2023

(87) PCT Pub. No.: WO2022/035123
PCT Pub. Date: Feb. 17, 2022

(65) Prior Publication Data
US 2023/0299387 A1 Sep. 21, 2023

(30) Foreign Application Priority Data

| Aug. 13, 2020 | (KR) | ........................ 10-2020-0101935 |
| Nov. 23, 2020 | (KR) | ........................ 10-2020-0158074 |
| Jun. 8, 2021 | (KR) | ........................ 10-2021-0074434 |

(51) Int. Cl.
*H01M 10/00* (2006.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ........... H01M 10/6567; H01M 10/613; H01M 10/625; H01M 10/647; H01M 10/6557; H01M 50/289
See application file for complete search history.

(56) References Cited

U.S. PATENT DOCUMENTS

| 10,283,755 | B2 | 5/2019 | Lim et al. |
| 2006/0214641 | A1 | 9/2006 | Cho |

(Continued)

FOREIGN PATENT DOCUMENTS

| CN | 1838463 | A | 9/2006 |
| CN | 102157715 | A | 8/2011 |

(Continued)

OTHER PUBLICATIONS

Search Report dated Oct. 22, 2024 from the Office Action for Chinese Application No. 202110928939.4 Issued Oct. 31, 2024, pp. 1-3. [see pp. 1-2, categorizing the cited references.].

(Continued)

*Primary Examiner* — Nicholas P D'Aniello
(74) *Attorney, Agent, or Firm* — Lerner David LLP

(57) ABSTRACT

A battery module comprises a sub module; a module housing configured to accommodate the sub module; a front sealing plate configured to cover a front opening of the module housing; and a rear sealing plate configured to cover a rear opening of the module housing. The sub module (Continued)

includes a cell stack assembly, a front bus bar frame assembly coupled to a front end of the cell stack assembly adjacent to the front opening of the module housing, and a rear bus bar frame assembly coupled to a rear end of the cell stack assembly adjacent to the rear opening of the module housing. The sub module includes a plurality of battery cells and a channel spacer interposed between adjacent battery cells. The front sealing plate has an inlet for introducing an insulation cooling liquid, and the rear sealing plate has an outlet for discharging the insulation cooling liquid.

20 Claims, 7 Drawing Sheets

(51) Int. Cl.

| | |
|---|---|
| *H01M 10/625* | (2014.01) |
| *H01M 10/647* | (2014.01) |
| *H01M 10/6557* | (2014.01) |
| *H01M 10/6567* | (2014.01) |
| *H01M 50/289* | (2021.01) |
| *H01M 50/548* | (2021.01) |

(52) U.S. Cl.
CPC ..... *H01M 10/647* (2015.04); *H01M 10/6557* (2015.04); *H01M 50/289* (2021.01); *H01M 50/548* (2021.01)

(56) References Cited

U.S. PATENT DOCUMENTS

| | | |
|---|---|---|
| 2009/0253034 A1 | 10/2009 | Nedelec |
| 2011/0293982 A1 | 12/2011 | Martz et al. |
| 2012/0114985 A1 | 5/2012 | Kim et al. |
| 2014/0120400 A1 | 5/2014 | Yoshioka et al. |
| 2015/0188203 A1 | 7/2015 | Enomoto et al. |
| 2016/0133999 A1 | 5/2016 | Lee et al. |
| 2017/0162923 A1 | 6/2017 | Deng et al. |
| 2018/0034116 A1 | 2/2018 | Tajima et al. |
| 2018/0194235 A1 | 7/2018 | Kim et al. |

| | | | |
|---|---|---|---|
| 2018/0254444 A1* | 9/2018 | Yoon | ............... H01M 50/211 |
| 2019/0296294 A1 | 9/2019 | Hirschbeck et al. | |
| 2020/0076025 A1 | 3/2020 | Jo et al. | |
| 2020/0136212 A1 | 4/2020 | Jung et al. | |
| 2020/0168864 A1 | 5/2020 | Seo et al. | |
| 2020/0176731 A1 | 6/2020 | Taga | |
| 2020/0343604 A1* | 10/2020 | Lee | ............... H01M 50/553 |
| 2023/0299387 A1 | 9/2023 | Ju et al. | |

FOREIGN PATENT DOCUMENTS

| | | |
|---|---|---|
| CN | 102544569 A | 7/2012 |
| CN | 104795606 A | 7/2015 |
| CN | 106374063 A | 2/2017 |
| CN | 206524390 U | 9/2017 |
| CN | 105247729 B | 9/2018 |
| CN | 110235274 A | 9/2019 |
| CN | 216288700 U | 4/2022 |
| JP | 2014-60088 A | 4/2014 |
| JP | WO2012/173269 A1 | 2/2015 |
| JP | 2016-146298 A | 8/2016 |
| JP | 2019036397 A | 3/2019 |
| KR | 2014-0037305 A | 3/2014 |
| KR | 20170084522 A | 7/2017 |
| KR | 2017-0132514 A | 12/2017 |
| KR | 2019-0064887 A | 6/2019 |
| KR | 2019-0078841 A | 7/2019 |
| KR | 20190126654 A | 11/2019 |
| KR | 2020-0048648 A | 5/2020 |

OTHER PUBLICATIONS

Extended European Search Report including Written Opinion for Application No. 21856129.8 dated Jan. 4, 2024, pp. 1-7.
Search Report dated May 23, 2025 from the Office Action for Chinese Application No. 202110928939.4 issued May 28, 2025, pp. 1-2.
International Search Report for PCT/KR2021/010297 mailed Nov. 16, 2021. 3 pgs.
Search Report dated Sep. 15, 2025 from the Office Action for Chinese Application No. 202110928939.4 issued Sep. 17, 2025, pp. 1-2.

* cited by examiner

BATTERY MODULE HAVING COOLING STRUCTURE USING INSULATION COOLANT, AND BATTERY PACK AND VEHICLE WHICH INCLUDE SAME

The present application is a national phase entry under 35 U.S.C. § 371 of International Application No. PCT/KR2021/010297 filed Aug. 4, 2021, which claims priority from: Korean Patent Application No. 10-2020-0101935 filed on Aug. 13, 2020, Korean Patent Application No. 10-2020-0158074 filed on Nov. 23, 2020, and Korean Patent Application No. 10-2021-0074434 filed on Jun. 8, 2021, the disclosures of which are incorporated herein by reference.

TECHNICAL FIELD

The present disclosure relates to a battery module having a cooling structure using an insulation cooling liquid, and a battery pack and a vehicle including the battery module. More specifically, the battery module has a structure in which an insulation cooling liquid introduced into a module housing to cool battery cells comes into direct contact with components such as electrode leads and bus bars of the battery cells to realize efficient cooling, and also the insulation cooling liquid may efficiently flow through a channel between adjacent battery cells.

BACKGROUND ART

In the case of a battery module adopting an indirect water cooling method using cooling water, the cooling performance is limited because the cooling water does not directly contact battery cells but rather indirectly contacts the battery cells through a module housing that accommodates the battery cells. In addition, since a cooling device such as a separate heatsink must be provided outside the module housing to form a channel for cooling, the overall volume of the battery module is inevitably increased, which causes a loss in terms of energy density.

In order to solve the problem of the indirect water cooling method, it is demanded to develop a battery module having a structure that allows a cooling liquid to flow directly into the module housing and realize rapid cooling through direct contact with the battery cells and electrical connection parts.

Meanwhile, in the case of a battery module having a direct cooling structure using such a cooling liquid, it is important to develop a channel structure for efficient cooling, but it is also very important to maintain airtightness so that the insulation cooling liquid does not leak out of the module housing and an end plate.

In particular, in the case of a battery module having a structure in which the pair of external terminals functioning as high-potential terminals of the battery module are exposed to the outside of the sealing plate and the end plate, for the electrical connection between an external terminal located outside the sealing plate and an internal terminal located inside the sealing plate, the sealing plate must have a structure that is partially perforated. Therefore, there is a risk that the insulation cooling liquid inside the module housing may leak through the perforated portion of the sealing plate, and it is demanded to develop a sealing structure that may effectively prevent such leakage in the perforated portion of the sealing plate.

DISCLOSURE

Technical Problem

The present disclosure is designed to solve the problems of the related art, and therefore the present disclosure is directed to providing a battery module having a structure in which an insulation cooling liquid is introduced into a module housing and comes into direct contact with battery cells and electric connection components to realize efficient cooling, and also the cooling liquid introduced into the module housing may smoothly flow.

In addition, the present disclosure is also directed to providing a battery module having a structure in which a pair of external terminals functioning as high-potential terminals of the battery module are exposed to the outside of the sealing plate and the end plate, where it is possible to efficiently prevent the cooling liquid from leaking through a perforated portion of the sealing plate.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a sub module including a cell stack assembly having a plurality of battery cells and a channel spacer interposed between adjacent battery cells, a front bus bar frame assembly coupled to one longitudinal side of the cell stack assembly, and a rear bus bar frame assembly coupled to the other longitudinal side of the cell stack assembly; a module housing configured to accommodate the sub module; a front sealing plate configured to cover an opening at one longitudinal side of the module housing and having an inlet for introducing an insulation cooling liquid; and a rear sealing plate configured to cover an opening at the other longitudinal side of the module housing and having an outlet for discharging the insulation cooling liquid.

The channel spacer may have a cooling liquid channel through which an insulation cooling liquid supplied into the battery module from the outside flows.

The cooling liquid channel may be formed through the channel spacer and extend along a longitudinal direction of the channel spacer.

The insulation cooling liquid flowing through the channel spacer may be in indirect contact with a body of the battery cell.

The front bus bar frame assembly may include a bus bar frame; and a plurality of bus bars fixed on the bus bar frame and coupled to electrode leads of the battery cells.

The bus bar frame may have a cooling liquid hole.

The battery module may further comprise a pair of terminal assemblies having an external terminal located at an outer side of the front sealing plate and a stud provided through the front sealing plate to electrically connect the external terminal and the battery cell.

The front bus bar frame assembly may further include a pair of internal terminals fixed on the bus bar frame and connected to electrode leads of a battery cell located at an outermost side among the battery cells provided in the cell stack assembly.

The stud may be fixed to the internal terminal.

The terminal assembly may further include a terminal spacer inserted into a terminal hole formed in the front sealing plate.

The stud may be provided through the terminal spacer.

The terminal assembly may further include a fastening nut fastened to the stud provided through the terminal spacer and the external terminal so that the external terminal is closely fixed to the terminal spacer.

The terminal assembly may further include a first O-ring configured to cover an outer circumferential surface of the terminal spacer and interposed between an inner surface of the front sealing plate and the internal terminal.

The stud may be press-fitted through the internal terminal.

The terminal assembly may further include a second O-ring located around the stud and interposed between the internal terminal and the bus bar frame.

Meanwhile, a battery pack and a vehicle according to an embodiment of the present disclosure comprises the battery module according to an embodiment of the present disclosure as described above.

Advantageous Effects

According to the present disclosure, the insulation cooling liquid may be introduced into the battery module to directly contact the battery cells and electrical connection parts, and the cooling liquid introduced into the battery module may flow smoothly, thereby enabling efficient and rapid cooling.

In addition, according to the present disclosure, it is possible to effectively prevent the insulation cooling liquid flowing inside the module housing for cooling the battery module from leaking. According to the present disclosure, in particular, in the battery module having a structure in which a pair of external terminals functioning as high-potential terminals of the battery module are exposed to the outside of the sealing plate and the end plate, it is possible to effectively prevent the insulation cooling liquid from leaking at the perforated portion of the sealing plate.

DESCRIPTION OF DRAWINGS

The accompanying drawings illustrate a preferred embodiment of the present disclosure and, together with the foregoing disclosure, serve to provide further understanding of the technical features of the present disclosure, and thus, the present disclosure is not construed as being limited to the drawings.

FIGS. 5 and 6 are diagrams showing the flow of an insulation cooling liquid for cooling.

FIGS. 8 and 9 are diagrams showing a detailed structure of a terminal assembly according to the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure, on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

Figure 1:
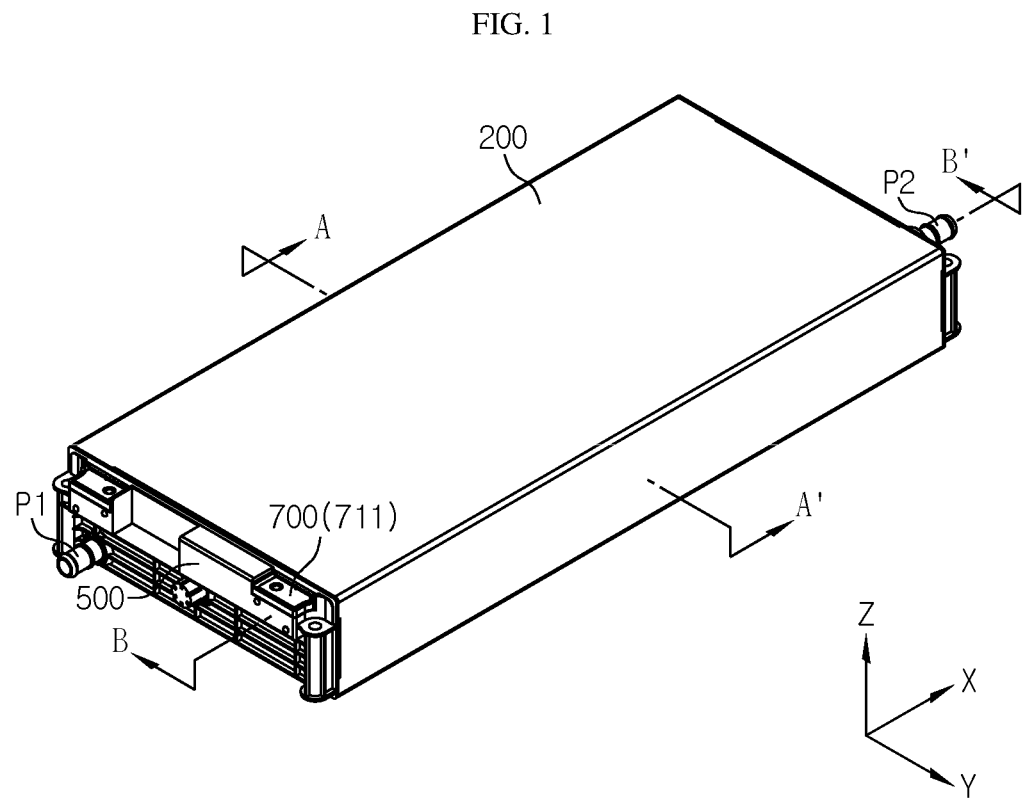
FIG. 1 is an assembled perspective view showing a battery module according to an embodiment of the present disclosure.
Figure 2:
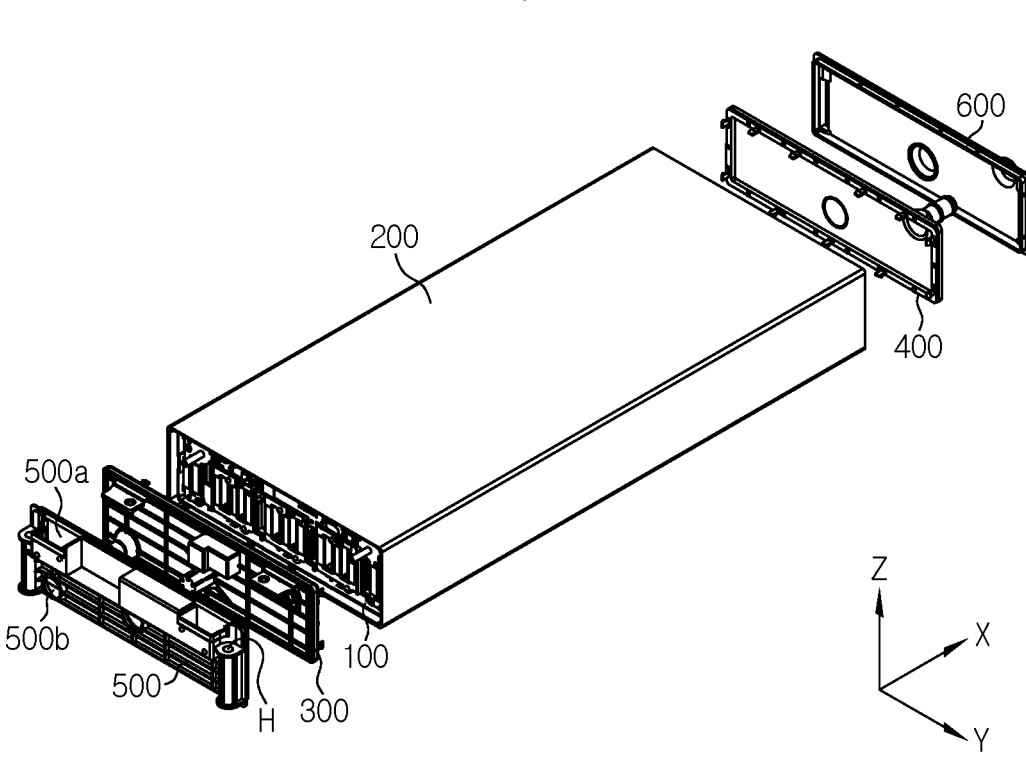
FIG. 2 is an exploded perspective view showing the battery module according to an embodiment of the present disclosure.
Figure 3:
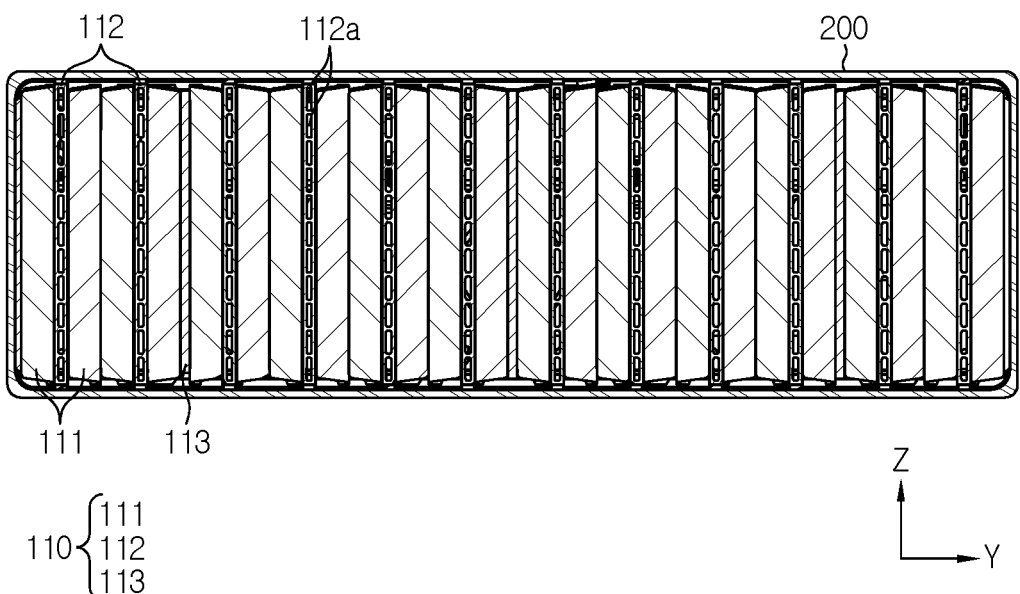
FIG. 3 is a sectional view, taken along the line A-A' of FIG. 1.
Figure 4:
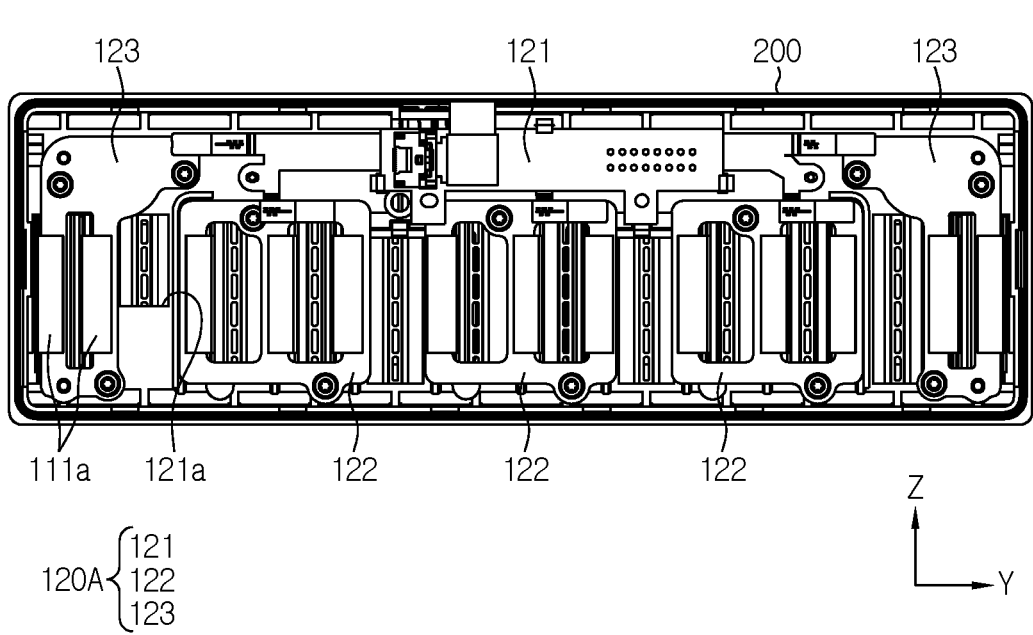
FIG. 4 is a diagram showing the battery module of FIG. 1, from which a front end plate and a front sealing plate are removed.

Referring to FIGS. 1 and 2, a battery module according to an embodiment of the present disclosure includes a sub module 100, a module housing 200, a front sealing plate 300 and a rear sealing plate 400. The battery module may further include a front end plate 500 and/or a rear end plate 600 and/or a pair of terminal assemblies 700 in addition to the above components.

Referring to FIGS. 2 to 6, the sub module 100 includes a cell stack assembly 110. The sub module 100 may further include a front bus bar frame assembly 120A and a rear bus bar frame assembly 120B coupled to the cell stack assembly 110, in addition to the cell stack assembly 110.

The cell stack assembly 110 includes a plurality of battery cells 111 and at least one channel spacer 112 interposed between adjacent battery cells 111. The cell stack assembly 110 may further include at least one buffer pad 113 interposed between adjacent battery cells 111. The battery cells 111, the channel spacer 112 and the buffer pad 113 are stacked in a vertical standing form on the ground (a surface parallel to the X-Y plane) to form a single cell stack assembly 110.

As the battery cell 111, a pouch-type battery cell having a pair of electrode leads 111*a* drawn out in opposite directions along a longitudinal direction of the battery cell 111 (a direction parallel to the X-axis) may be used.

The channel spacer 112 includes at least one cooling liquid channel 112*a* through which an insulation cooling liquid supplied into the battery module from the outside may flow. The cooling liquid channel 112*a* is formed through the channel spacer 112 and extends along a longitudinal direction of the channel spacer 112 (a direction parallel to the X-axis). If a plurality of cooling liquid channels 112*a* are provided, the plurality of cooling liquid channels 112*a* are disposed to be spaced apart from each other in a height direction of the channel spacer 112 (a direction parallel to the Z-axis). In the present disclosure, the insulation cooling liquid used for cooling is a cooling liquid with improved insulation, and, for example, an insulation oil may be used.

The channel spacer 112 may be interposed between adjacent battery cells 111, respectively. In this case, each battery cell 111 is configured such that one surface and the other surface thereof are both in contact with a respective channel spacer 112, so the battery cell 111 has an advantage in that the cooling effect is maximized and the flow of the insulation cooling liquid introduced into the battery module becomes smoother.

Meanwhile, unlike this, the number of the channel spacers 112 utilized may also be approximately ½ of the number of the battery cells 111. Specifically, the plurality of channel spacers 112 may also be arranged such that a pair of battery cells 111 contacting each other is positioned between a pair of adjacent channel spacers 112. In this case, all the battery cells 111 are configured such that only one side thereof is in contact with a channel spacer 112. If the plurality of channel spacers 112 are arranged in this way, both the cooling efficiency of the battery cell 111 and the energy density may be improved. The cooling liquid channel 112*a* has a hole shape formed therethrough along the longitudinal direction of the channel spacer 112 (a direction parallel to the X-axis).

Therefore, the insulation cooling liquid flowing through the channel spacer 112 does not directly contact a body of the battery cell 111, but rather indirectly contacts the body of the battery cell 111 through the channel spacer 112. A plurality of the cooling liquid channels 112*a* may be provided. In this case, the cooling liquid channels 112*a* may be formed to be spaced apart from each other along a height direction of the channel spacer 112 (a direction parallel to the Z-axis).

The channel spacer 112 is configured such that both surfaces thereof are entirely in contact with the body of a respective battery cell 111. Therefore, when a battery cell 111 swells, a uniform pressure may be applied to the body of the battery cell 111 as a whole, and accordingly, a phenomenon that the pressure is applied intensively to only a partial region of the battery cell 111 does not occur, thereby preventing the battery cell 111 from being damaged.

The channel spacer 112 may be made of, for example, a metal material with excellent thermal conductivity, such as aluminum. In this case, although the battery module of the present disclosure has a structure in which the insulation cooling liquid and the body of the battery cell 111 do not directly contact, the cooling efficiency for the body of the battery cell 111 is practically not inferior, compared to the case where the insulation cooling liquid directly contacts the body of the battery cell 111. That is, the channel spacer 112 of the present disclosure has both a function as a buffer member for stably buffering the battery cell 111 without damage when the battery cell 111 swells, and a function as a cooling member for realizing efficient cooling.

The insulation cooling liquid is introduced into the battery module through an inlet P1 to cool the electrode lead 111*a* and a bus bar 122 provided at one side of the battery cell 111 in a longitudinal direction (a direction parallel to the X-axis), and then cools the body of battery cell 111 while passing through the channel spacer 112. In addition, after cooling the body of the battery cell 111, the insulation cooling liquid cools the electrode lead 111*a* and a bus bar 122 provided at the other longitudinal side of the battery cell 111 while being discharged to the outside of the battery module through an outlet P2. In addition, if the front bus bar frame assembly 120A of the present disclosure includes an internal terminal 123, explained later, the insulation cooling liquid may also contact the internal terminal 123 to quickly cool the internal terminal 123. Through this process, the insulation cooling liquid may effectively cool the sub module 100 inside the module housing 200 as a whole. In the battery cell 111, the place where heat is most intensively generated is the electrode lead 111*a*. Since the battery module of the present disclosure allows the electrode lead 111*a* to be efficiently cooled, it is possible to improve the cooling efficiency of the overall battery module. In addition, a lot of heat may also be generated from the bus bar 122 and the internal terminal 123, where currents generated from the plurality of battery cells 111 are collected, and the battery module of the present disclosure may allow these electrically connected components to be efficiently cooled, thereby providing excellent cooling efficiency.

The buffer pad 113 may be interposed between adjacent battery cells 111 to absorb volume expansion caused by swelling of the battery cells 111.

The front bus bar frame assembly 120A and the rear bus bar frame assembly 120B are respectively coupled to one side and the other side of the cell stack assembly 110 in the longitudinal direction (a direction parallel to the X-axis) to electrically connect the plurality of battery cells 111. According to an embodiment, the front bus bar frame assembly 120A may have an internal terminal 123, and the rear bus bar frame assembly 120B has substantially the same structure as the front bus bar frame assembly 120A, except that it does not include the internal terminal 123. Accordingly, the specific structure of the rear bus bar frame assembly 120B will not be described in detail, and the specific structure of the front bus bar frame assembly 120A will be intensively described.

Referring to FIGS. 4 to 7, the front bus bar frame assembly 120A includes a bus bar frame 121 and a plurality of bus bars 122. In addition, the front bus bar frame assembly 120A may further include a pair of internal terminals 123. The bus bar frame 121 covers one side of the cell stack assembly 110 in the longitudinal direction (a direction parallel to the X-axis).

The bus bar frame 121 has a plurality of cooling liquid holes 121*a*. The cooling liquid hole 121*a* functions as a passage through which the insulation cooling liquid introduced into the module housing 200 through the inlet P1 provided at the front sealing plate 300 may flow into the cell stack assembly 110 through the bus bar frame 121.

In consideration of this function, the cooling liquid hole 121*a* may be formed at a position corresponding to the channel spacer 112 provided at the cell stack assembly 110. Also, the cooling liquid hole 121*a* may have a size corresponding to the channel spacer 112.

Figure 5:
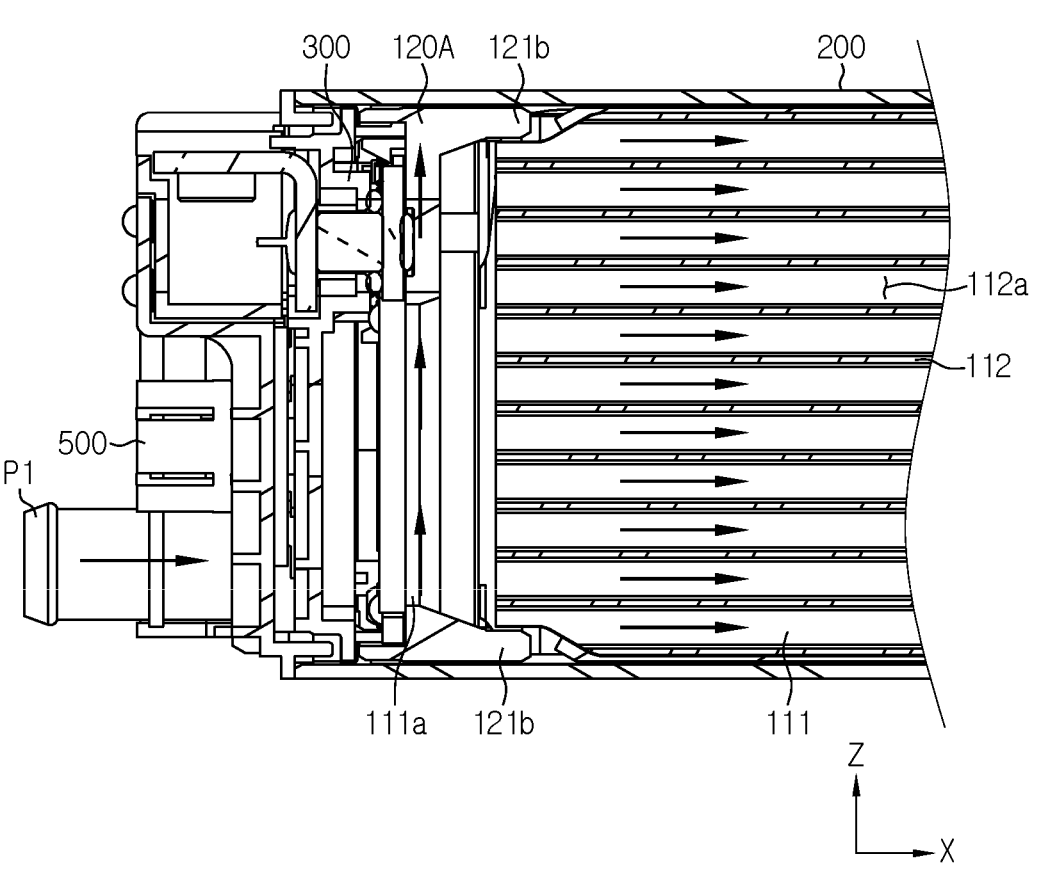
Figure 6:
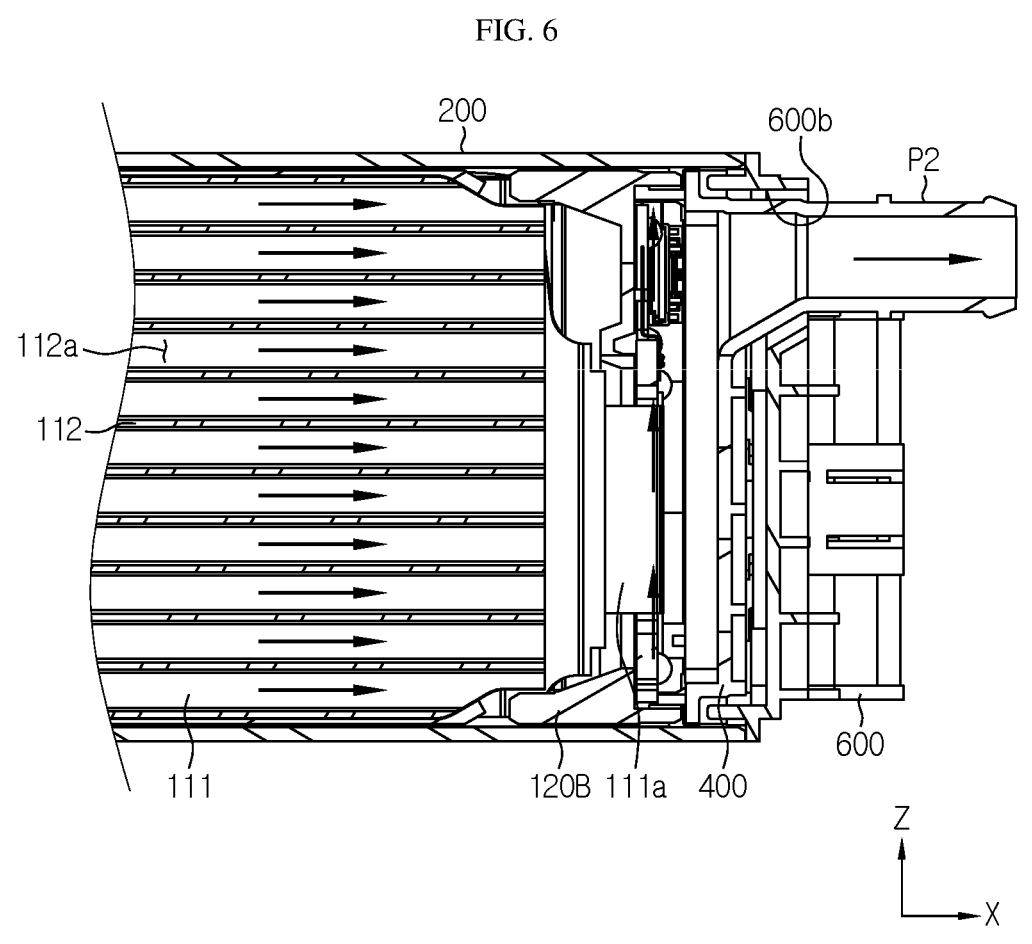

The cooling liquid introduced into the cell stack assembly 110 through the cooling liquid hole 121*a* formed in the front bus bar frame assembly 120A moves toward the rear bus bar frame assembly 120B through the cooling liquid channel 112*a* formed at the channel spacer 112 along an arrow (see FIGS. 5 and 6). The insulation cooling liquid that has moved toward the rear bus bar frame assembly 120B flows into the rear sealing plate 400 through cooling liquid hole 121*a* formed in the rear bus bar frame assembly 120B, and is discharged to the outside of the battery module through the outlet P2 provided at the rear sealing plate 400. In this process, the insulation cooling liquid comes into direct contact with electrical connection parts such as the electrode lead 111*a* of the battery cell 111 and comes into indirect contact with the body of the battery cell 111 to cool the inside of the battery module.

The bus bar 122 is fixed on the bus bar frame 121 and is coupled to the electrode lead 111*a* drawn out through a lead slit formed at the bus bar frame 121 to electrically connect the plurality of battery cells 111.

The internal terminal 123 is fixed on the bus bar frame 121 and is coupled to the electrode lead 111*a* of a battery cell 111 located at an outermost side among the battery cells 111 provided in the cell stack assembly 110. The internal terminal 123 functions as a high-potential terminal. The internal terminal 123 located at one side of the bus bar frame 121 in the longitudinal direction (a direction to parallel to the Y-axis) functions as a positive electrode high-potential terminal, and the internal terminal 123 located at the other longitudinal side of the bus bar frame 121 functions as a negative electrode high-potential terminal. The internal terminal 123 is electrically connected to an external terminal 710 (see FIGS. 8 and 9), explained later.

The insulation cooling liquid introduced into the battery module may fill the space between the front sealing plate 300 and the front bus bar frame assembly 120A, and may also fill the space between the rear sealing plate 400 and the rear bus bar frame assembly 120B. Accordingly, the insulation cooling liquid comes into contact with the electrode lead 111*a*, the bus bar 122 and the internal terminal 123, which are components that may generate heat intensively, thereby cooling the battery module efficiently.

Figure 7:
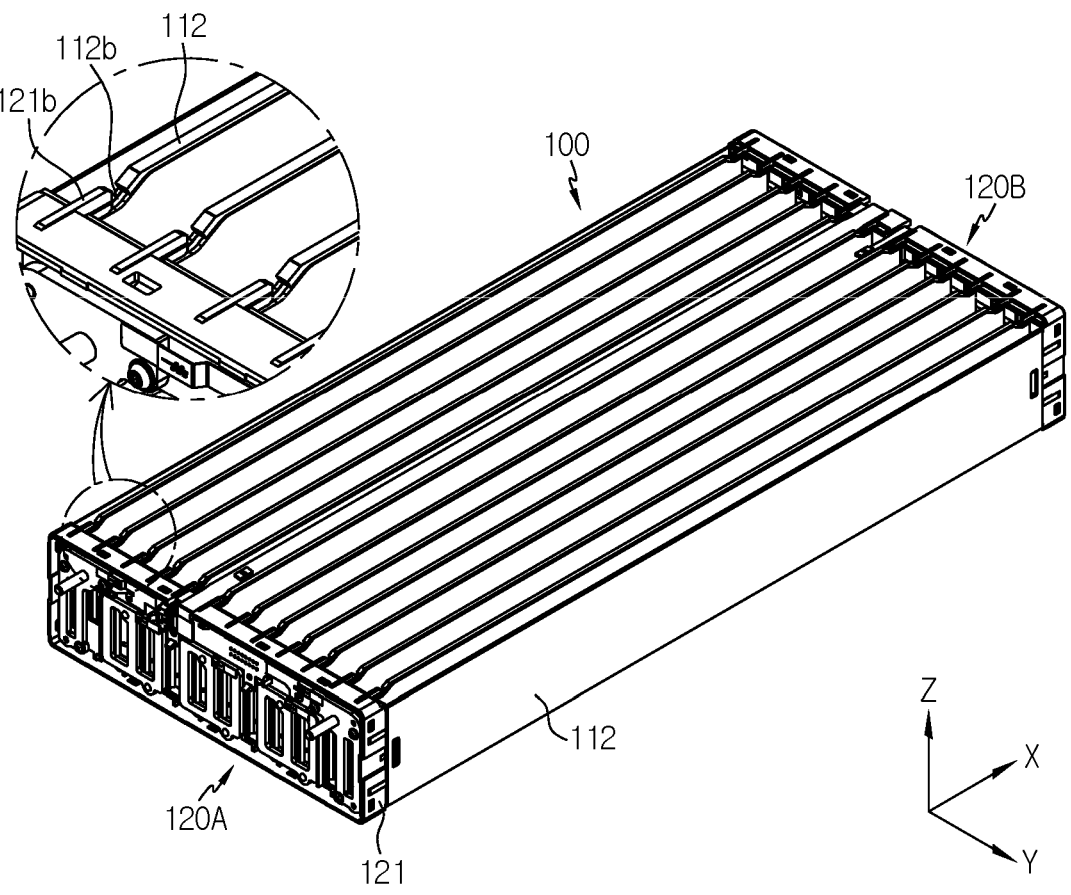
FIG. 7 is a diagram showing a coupling structure of a bus bar frame and a channel spacer according to the present disclosure.

Meanwhile, referring to FIGS. 5, 6 and 7, the bus bar frame 121 of the front bus bar frame assembly 120A and the bus bar frame 121 of the rear bus bar frame assembly 120B have a plurality of guide ribs 121b formed at the top and bottom thereof along the longitudinal direction of the bus bar frame 121 (a direction parallel to the Y-axis). The guide rib 121b has a shape extending toward the cell stack assembly 110. The guide rib 121b is formed at a position corresponding to the channel spacer 112.

Meanwhile, at both ends of the channel spacer 112 in the longitudinal direction (a direction parallel to the X-axis), fixing portions 112b having a shape corresponding to the guide ribs 121b and provided at positions corresponding to the guide ribs 121b are formed. Movement of the channel spacer 112 in a vertical direction (a direction parallel to the Z-axis) and a longitudinal direction (a direction parallel to the X-axis) is restricted by the guide ribs 121b and the fixing portions 112b. Accordingly, when the front bus bar frame assembly 120A and the rear bus bar frame assembly 120B are coupled to the cell stack assembly 110, the coupling position may be guided, thereby increasing the convenience of assembly.

Referring to FIGS. 1 to 6, the module housing 200 accommodates the sub module 100 including the cell stack assembly 110, the front bus bar frame assembly 120A and the rear bus bar frame assembly 120B. The module housing 200 is configured such that one side and the other side thereof in the longitudinal direction (a direction parallel to the X-axis) are opened.

Referring to FIGS. 5, 6, 8 and 9, the front sealing plate 300 covers the opening formed at one side of the module housing 200 in the longitudinal direction (a direction parallel to the X-axis). The front sealing plate 300 has an inlet P1 for introducing the insulation cooling liquid. In order to prevent the cooling liquid from leaking, an insulation sealing member G may be interposed between an edge surface of the front sealing plate 300 and an inner surface of the module housing 200 (see FIG. 9). The sealing member G may be, for example, a gasket.

The front sealing plate 300 has a pair of terminal holes 300a through which parts for electrical connection between the internal terminal 123 provided at the front bus bar frame assembly 120A and the external terminal 710, explained later, may pass. The terminal hole 300a is formed at a position corresponding to the internal terminal 123.

Referring to FIG. 6, the rear sealing plate 400 covers the opening at the other side of the module housing 200 in the longitudinal direction (a direction parallel to the X-axis), and has an outlet P2 for discharging the insulation cooling liquid. Similar to the front sealing plate 300, a sealing member G may be interposed between the edge surface of the rear sealing plate 400 and the inner surface of the module housing 200 to prevent the insulation cooling liquid from leaking. The sealing member G may be, for example, a gasket.

The front sealing plate 300 and the rear sealing plate 400 may be made of an insulating resin for electrical insulation.

Figure 8:
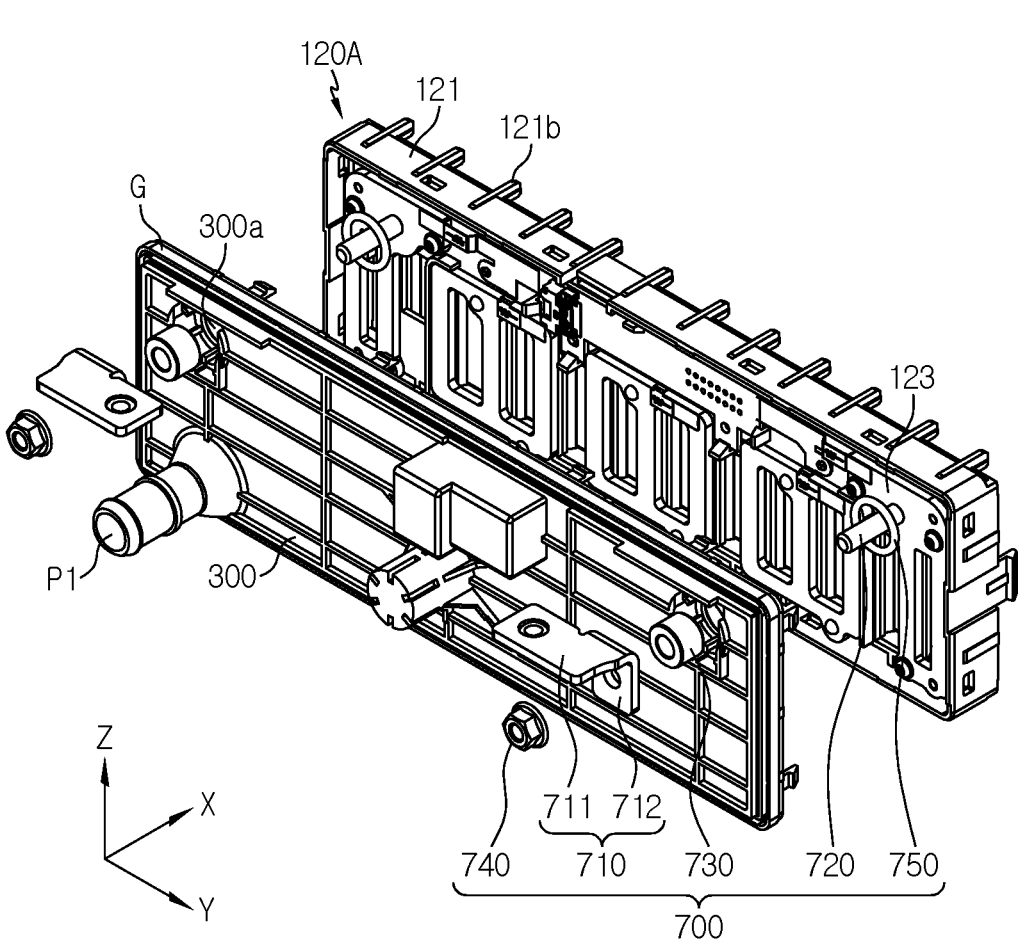
Figure 9:
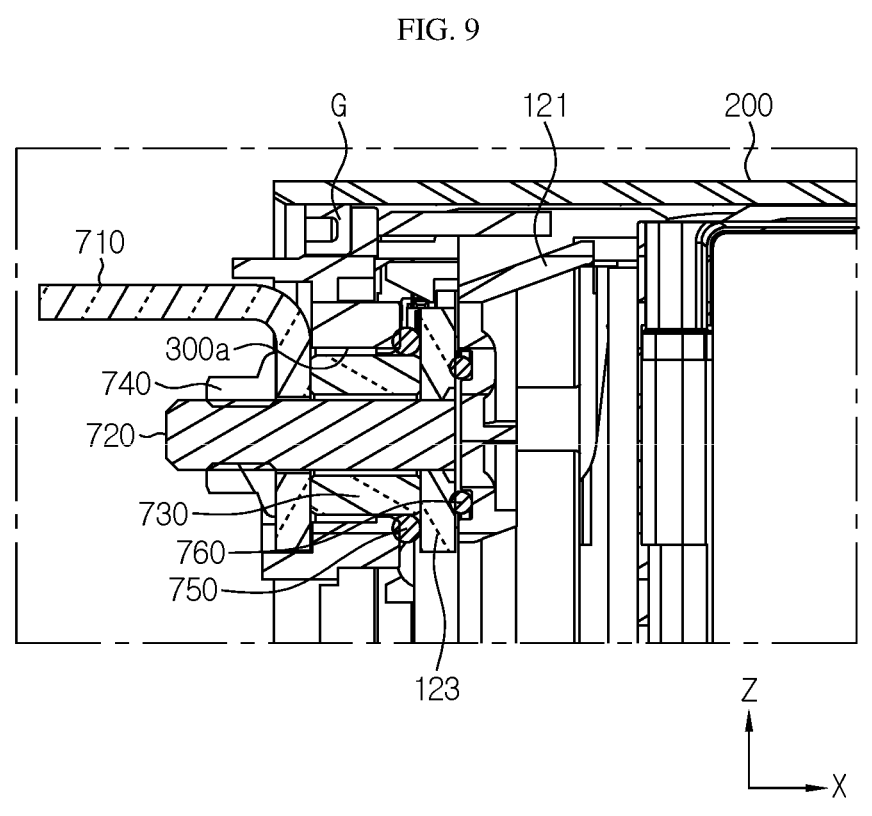

Referring to FIGS. 8 and 9, the terminal assembly 700 includes an external terminal 710 positioned at an outer side of the front sealing plate 300 and a stud 720 for electrically connecting the external terminal 710 and the battery cell 111. The stud 720 is fixed to the internal terminal 123. The stud 720 may be fixed to the internal terminal 123 by being press-fitted through the internal terminal 123. The stud 720 fixed to the internal terminal 123 is drawn out through the terminal hole 300a formed in the front sealing plate 300 and coupled to the external terminal 710.

The terminal assembly 700 may further include a ring-shaped terminal spacer 730 inserted into the terminal hole 300a formed in the front sealing plate 300. The terminal spacer 730 may be made of a metal material. If the terminal spacer 730 is provided, stud 720 passes through the terminal spacer 730.

The terminal assembly 700 may further include a fastening nut 740 for fastening the external terminal 710 to the stud 720. The fastening nut 740 is fastened to the stud 720 passing through the terminal spacer 730 and the fastening portion 712 of the external terminal 710 so that the fastening portion 712 of the external terminal 710 is closely fixed to the terminal spacer 730. Accordingly, the internal terminal 123 and the external terminal 710 are electrically connected to each other through the terminal spacer 730.

The terminal assembly 700 may further include a first O-ring 750 that covers an outer circumferential surface of the terminal spacer 730 and is interposed between the inner surface of the front sealing plate 300 and the internal terminal 123. Referring to FIG. 9, the first O-ring 750 prevents the insulation cooling liquid introduced into the space between the front sealing plate 300 and the bus bar frame 121 from leaking to the outside of the front sealing plate 300 through the space between the inner surface of the terminal hole 300a and the terminal spacer 730.

In addition, the terminal assembly 700 may be further include a second O-ring 760 that is located around the stud 720 press-fitted into the internal terminal 123 and exposed to the space between the internal terminal 123 and the bus bar frame 121 and is interposed between the internal terminal 123 and the bus bar frame 121. The second O-ring 760 prevents the insulation cooling liquid introduced into the space between the front sealing plate 300 and the bus bar frame 121 from leaking to the outside of the front sealing plate 300 through the space between the internal terminal 123 and the stud 720 and the space between the inner surface of the terminal spacer 730 and the stud 720.

Referring to FIGS. 1 and 2 and FIGS. 5 and 6, the front end plate 500 covers the front sealing plate 300 and is fixed to the module housing 200. The rear end plate 600 covers the rear sealing plate 400 and is fixed to the module housing 200.

The front end plate 500 includes a terminal exposing portion 500a for exposing the connection portion 711 of the external terminal 710 to the outside of the front end plate 500 and an inlet exposing portion 500b for exposing the inlet P1 to the outside of the front end plate 500. The rear end plate 600 includes an outlet exposing portion 600b for exposing the outlet P2 to the outside of the rear end plate 600.

When the front end plate 500 and the rear end plate 600 are applied, a gasket (not shown) may be interposed in the coupling portion between the front end plate 500 and the module housing 200 and in the coupling portion between the rear end plate 600 and the module housing 200 in order to prevent the insulation cooling liquid from leaking.

Meanwhile, a battery pack and a vehicle according to an embodiment of the present disclosure include the battery module according to the present disclosure as described above. The battery pack includes at least one battery module according to the present disclosure and a pack housing for accommodating the at least one battery module. The battery module may be fastened to the pack housing through a fastening hole H formed in the front end plate 500 and/or the rear end plate 600. That is, the fastening hole H may provide a space into which a fastening means such as a bolt for fastening the pack housing and the battery module is inserted. Meanwhile, if the battery pack includes a plurality of battery modules, the plurality of battery modules may be fastened to each other through the fastening hole H formed in the front end plate 500 and/or the rear end plate 600.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:

a sub module including a cell stack assembly, a front bus bar frame assembly coupled to a front end of the cell stack assembly, and a rear bus bar frame assembly coupled to a rear end of the cell stack assembly, wherein the cell stack assembly includes a plurality of battery cells and a channel spacer interposed between adjacent ones of the plurality of battery cells;

a module housing configured to accommodate the sub module;

a front sealing plate configured to cover a front opening of the module housing adjacent the front end of the cell stack assembly, the front sealing plate having an inlet for introducing an insulation cooling liquid;

a rear sealing plate configured to cover a rear opening of the module housing adjacent the rear end of the cell stack assembly, the rear sealing plate having an outlet for discharging the insulation cooling liquid; and a terminal assembly coupled to the front sealing plate, the terminal assembly including an external terminal positioned along an outer side of the front sealing plate, the terminal assembly including a stud extending from the front bus bar frame assembly through a terminal hole in the front sealing plate to electrically connect the external terminal and the plurality of battery cells, and the terminal assembly including a terminal spacer axially aligned with the terminal hole, wherein the stud extends through the terminal spacer such that the terminal spacer is concentrically arranged around the stud.

2. The battery module according to claim 1, wherein the channel spacer has a cooling liquid channel through which the insulation cooling liquid flows, and the cooling liquid channel is formed through the channel spacer and extends along a longitudinal direction of the channel spacer.

3. The battery module according to claim 2, wherein the channel spacer is interposed between the adjacent ones of the plurality of battery cells such that the insulation cooling liquid flowing through the channel spacer is in indirect contact with a body of each of the adjacent battery cells.

4. The battery module according to claim 1, wherein the front bus bar frame assembly includes:

a bus bar frame; and a plurality of bus bars fixed on the bus bar frame and coupled to electrode leads of the plurality of battery cells.

5. The battery module according to claim 4, wherein the bus bar frame has a cooling liquid hole for receiving the insulation cooling liquid therethrough.

6. The battery module according to claim 4, wherein the front bus bar frame assembly further includes an internal terminal fixed on the bus bar frame and connected to an electrode lead of one of the plurality of battery cells located at an outermost side of the cell stack assembly along a stacking direction of the plurality of battery cells in the cell stack assembly, and wherein the stud is coupled to the internal terminal.

7. The battery module according to claim 6, wherein the terminal spacer is electrically conductive such that the internal terminal and the external terminal are electrically connected to each other through the terminal spacer.

8. The battery module according to claim 7, wherein the terminal assembly further includes a fastening nut fastened to the stud and the external terminal so that the external terminal is securely fixed to the terminal spacer.

9. The battery module according to claim 6, wherein the terminal assembly further includes a first O-ring configured to cover an outer circumferential surface of the terminal spacer and interposed between an inner surface of the front sealing plate and the internal terminal.

10. The battery module according to claim 9, wherein the stud is press fit through an opening in the internal terminal.

11. The battery module according to claim 10, wherein the terminal assembly further includes a second O-ring extending around the stud and interposed between the internal terminal and the bus bar frame.

12. A battery pack, comprising the battery module according to claim 1.

13. A vehicle, comprising the battery module according to claim 1.

14. The battery module according to claim 1, wherein the front sealing plate contacts the module housing along a perimeter of the front sealing plate to define a perimeter seal therebetween.

15. A battery module, comprising:

a sub module including a cell stack assembly, a front bus bar frame assembly coupled to a front end of the cell stack assembly, the front bus bar frame assembly including a bus bar frame having a plurality of bus bars fixed thereon, and a rear bus bar frame assembly coupled to a rear end of the cell stack assembly, wherein the cell stack assembly includes a plurality of battery cells having respective electrode leads coupled to the plurality of bus bars, and wherein the cell stack assembly includes a channel spacer interposed between adjacent ones of the plurality of battery cells;

a module housing configured to accommodate the sub module;

a front sealing plate configured to cover a front opening of the module housing adjacent the front end of the cell stack assembly, the front sealing plate being spaced forwardly from the front bus bar frame assembly so as to define an open space between the front sealing plate and the front bus bar frame assembly, the front sealing plate having an inlet for introducing an insulation cooling liquid into the open space between the front sealing plate and the front bus bar frame assembly such that the insulation cooling liquid comes into contact with the plurality of bus bars and the respective electrode leads in the open space; and a rear sealing plate configured to cover a rear opening of the module housing adjacent the rear end of the cell stack assembly, the rear sealing plate having an outlet for discharging the insulation cooling liquid;

wherein the open space communicates with a cooling liquid channel of the channel spacer such that insulation cooling liquid introduced through the inlet into the open space can pass through the cooling liquid channel before being discharged through the outlet.

16. The battery module according to claim 15, wherein the open space communicates with the cooling liquid channel of the channel spacer via a cooling liquid hole in the bus bar frame for receiving the insulation cooling liquid therethrough.

17. The battery module according to claim 15, wherein the front sealing plate contacts the module housing along a perimeter of the front sealing plate to define a perimeter seal therebetween.

18. The battery module according to claim 17, wherein the front bus bar assembly is electrically connected to a stud extending through the front sealing plate within a region encircled by the perimeter seal.

19. A battery pack, comprising the battery module according to claim 15.

20. A vehicle, comprising the battery module according to claim 15.

* * * * *